UNITED STATES PATENT OFFICE.

ELISHA BARTON CUTTEN, OF NEW YORK, N. Y.

METHOD OF ELECTROLYTICALLY PRODUCING POTASSIUM CHLORATE.

SPECIFICATION forming part of Letters Patent No. 491,701, dated February 14, 1893.

Application filed April 11, 1892. Serial No. 428,738. (No specimens.)

*To all whom it may concern:*

Be it known that I, ELISHA BARTON CUTTEN, of the city, county, and State of New York, have invented a new and useful Improvement in Methods of Electrolytically Producing Potassium Chlorate, of which the following is a specification.

My invention consists in a new method of electrolytically producing potassium chlorate by electrolyzing a solution of magnesium or calcium chloride in the presence of potassium chloride, and also in the continuous mode of carrying said method into effect by means of which the electrolyte containing potassium chloride is electrolyzed through the agency of an alternating current.

I carry my process into effect in the following way:—The outer vessel of the electrolytic cell is preferably made of carbon, and serves as one electrode. The other electrode is also of carbon, and is supported in any suitable way within said vessel. The electrolyte is a solution of magnesium chloride to which potassium chloride, is added. The proportions of the two ingredients will depend, of course, upon their chemical combining proportions. Upon electrolysis, the magnesium chloride is decomposed to produce chlorine at the anode, which gas may be suitably drawn off or allowed to escape, and also metallic magnesium on the surface of the cathode. The metallic magnesium combines with water to form magnesium oxide, the hydrogen escaping. When the current is reversed, the magnesium oxide produced combines with chlorine from the solution to produce magnesium chloride, and oxygen is set free at the pole which is now the anode. At the cathode magnesium is deposited, as before. The freed oxygen combines with the potassium in the potassium chloride to produce potassium chlorate.

It will be observed that the magnesium chloride in the solution constantly renews itself, and that the process, by reason of the alternation of the current, becomes a continuous one; the potassium chlorate being constantly removed and new potassium chloride being constantly added.

I have used a current alternating at intervals of from thirty seconds up to five minutes. Possibly longer periods of alternation may be desirable. The chlorate of potash is obtained by drawing off the solution, evaporating and crystallizing in the usual way.

I claim:—

The continuous method of electrolytically producing potassium chlorate, which consists in electrolyzing, by means of a slowly alternating current, a solution of magnesium chloride in the presence of potassium chloride.

ELISHA BARTON CUTTEN.

Witnesses:
H. R. MOLLER,
M. BOSCH.